United States Patent [19]

Miller et al.

[11] Patent Number: 5,510,040
[45] Date of Patent: Apr. 23, 1996

[54] REMOVAL OF SELENIUM FROM WATER BY COMPLEXATION WITH POLYMERIC DITHIOCARBAMATES

[75] Inventors: Thomas M. Miller, Aurora; Walter H. Goodman, Lisle, both of Ill.

[73] Assignee: Nalco Chemical Company, Naperville, Ill.

[21] Appl. No.: 343,061

[22] Filed: Nov. 21, 1994

[51] Int. Cl.⁶ ........................................ C02F 1/58
[52] U.S. Cl. ..................... 210/721; 210/725; 210/727; 210/911; 210/912
[58] Field of Search ................... 210/721, 725, 210/727, 728, 902, 912, 913, 911

[56] References Cited

U.S. PATENT DOCUMENTS

| | | | |
|---|---|---|---|
| 3,966,601 | 6/1976 | Stevenson et al. | 210/727 |
| 4,405,464 | 9/1983 | Baldwin et al. | 210/717 |
| 4,578,195 | 3/1986 | Moore et al. | 210/912 |
| 4,806,264 | 2/1989 | Murphy et al. | 210/695 |
| 4,940,549 | 7/1990 | Olsen et al. | 210/695 |
| 5,071,568 | 12/1991 | Bennett et al. | 219/754 |
| 5,164,095 | 11/1992 | Sparapany et al. | 210/735 |
| 5,200,082 | 4/1993 | Olsen et al. | 210/667 |
| 5,264,133 | 11/1993 | Forschner et al. | 210/912 |
| 5,264,135 | 11/1993 | Mohn | 210/912 |
| 5,346,627 | 9/1994 | Siefert et al. | 210/736 |
| 5,347,071 | 9/1994 | Moriya et al. | 210/913 |

*Primary Examiner*—Peter A. Hruskoci
*Assistant Examiner*—Theodore M. Green
*Attorney, Agent, or Firm*—Robert A. Miller; James J. Drake

[57] ABSTRACT

Selenium compounds present in aqueous liquids can be removed using a poly dithiocarbamate materials. The selenium compounds are then removed by precipitation or sedimentation. Optionally, an oxidizing agent may be added to the system prior to the addition of the poly dithiocarbamate. Various filtration methods may be employed to remove the selenium-dithiocarbamate materials from aqueous liquids.

25 Claims, No Drawings

REMOVAL OF SELENIUM FROM WATER BY COMPLEXATION WITH POLYMERIC DITHIOCARBAMATES

INTRODUCTION

Selenium compounds are reported to comprise 0.9 ppm of the earth's crust. While important as a trace mineral in living organisms, selenium is known to be toxic to life in small quantities. Selenium compounds are found naturally in ground waters, and in agricultural runoffs from the use of selenium containing insecticides and herbicides. Recently, environmental and public health concerns have dictated that selenium compounds be removed from industrial water systems prior to their discharge into nature. During the usage of industrial water, say for instance in a cooling tower or boiler, the water is evaporated, concentrating impurities that were found in naturally occurring quantities into higher concentrations. Selenium compounds likewise are present in crude oil and other fossil fuels such as coal. During the processing of these materials, selenium may also be recovered, often in an aqueous system. Selenium compounds found in cooling tower and boiler water blowdowns as well as in aqueous waste waters from the processing of crude oil and other fossil fuels accordingly often contain selenium which has been concentrated over the trace amounts found in nature to amounts which are, or will be prohibited from being discharged into streams, lakes, rivers, and oceans.

Selenium commonly exists in the −2, 0, +4, and +6 oxidation states. In addition, the +2 oxidation state is readily accessible in die laboratory. The −2 oxidation state most commonly occurs as hydrogen selenide, or in organic selenium compounds. The aqueous chemistry includes both selenite ($SeO_3^{-2}$, selenium +4), and selenate ($SeO_4^{-2}$, selenium +6). The prior art has suggested the removal of Selenium in two common methods. One, Ferric coprecipitation, involves the addition of a ferric salt, typically ferric chloride or sulfate to the waste water. Adjustment of pH precipitates the iron as ferric hydroxide. Selenite is strongly adsorbed on the ferric hydroxide floe. Selenate is adsorbed less strongly and seems to compete for the same adsorption sites as sulfate as a high sulfate content will inhibit selenate removal. Likewise $Fe_2(SeO_3)_3$ may be precipitated by the addition or formation of a ferric hydroxide floe. Selenite removal strongly depends on the final pH of the solution. The optimal pH value being around 6 with removal decreasing as the pH value increases.

U.S. Pat. No. 5,071,568 which is hereinafter incorporated by reference into this specification, removes selenium from aqueous systems by treatment with an oxidizing agent to raise the valence of any selenium present in less than a +4 valence state to Se(IV) followed by treatment with $FeCl_2$ and air. The air serves to oxidize ferrous ions in situ to ferric ions which precipitate as ferric hydroxide. The process is stated to remove at least 50% of selenium in the water. Again, an iron containing sludge is produced. This sludge is voluminous in comparison to the amount of selenium originally present in the water. If the sludge is not further treated to remove selenium, a voluminous amount of a hazardous waste sludge will require disposal.

Chemical reduction/oxidation may also be used to remove selenium compounds from waste water. In this type of process, ferrous ion is typically used. Reduction with ferrous ions most often precedes ferric coprecipitation. In addition, sulfur based reductants such as sulfur dioxide and various metals such as iron and zinc have been used. Some of these reducing agents can reduce selenite and selenate to selenium (0) which forms a colloidal precipitate.

U.S. Pat. No. 4,405,464 discloses the removal of Se(VI) compounds using metallic iron. The iron reduces Se(VI) to a lower oxidation state and then dissolves in the aqueous solution. If the pH is maintained at greater than about 2.3, the patent states that the selenate ions are reduced to at least the Se (IV) oxidation state and the dissolved metallic iron hydrolyzes to form iron hydroxide that precipitates. The precipitated material is separated from the aqueous solution to provide a solution having a reduced selenium ion concentration. If the pH is maintained lower than 2.3, no iron hydroxide is formed, and the patent states that it is believed that at least a portion of the selenium is reduced to the elemental state [Se(0)]. The elemental selenium is then removed from the solution by sedimentation or filtration. This method results in an acidified solution, with less than total selenium removal.

U.S. Pat. Nos. 4,940,549 and 5,200,082 allege nearly 100% selenium removal from agricultural irrigation water. The method involves the concentration of the liquid to about 30% dissolved solids, adjusting pH to an acid pH value, heating to 150° F., treatment with a reducing agent such as powdered iron to lower selenium having a +6 valence to about +4 and lower valences. Wettable sulfur is then added to improve the effectiveness of the iron in reducing the selenium in solution. Following total reduction of Se(IV) to lower valence states using the iron/sulfur combination at elevated temperature, the pH is allowed to rise and the mixture is treated with an oxidizing agent. The mixture is then heated to 180° F. with agitation, and the resulting precipitates are removed. Iron may be recycled. While directed to the same problem as the instant invention, the '549 and '082 references involve separate acidification, oxidizing, and reducing steps, in the presence of yet another undesirable material, sulfur.

U.S. Pat. No. 4,806,264 treats an aqueous solution containing selenium ions with a ferrous ion at a pH of about 9. Ferric oxides, containing elemental selenium produced by the reduction of selenium ions is then accomplished. The patent states that elemental selenium may be recovered from the ferric oxides by treatment with strong acids.

The subject invention is directed to the removal of selenite and selenate materials through the use of certain polymeric dithiocarbamate materials which, when added to water containing the selenate and selenite species, will produce a coagulated selenite or selenate precipitate. The selenite and selenate species are then removed by filtration, coagulation, flocculation, or other solids/liquids separation process to remove substantially all of the selenium compounds present the water. The process of the present invention may be practiced with the addition of an oxidizing agent to oxidize lower valent forms of selenium to Se(IV) or Se(VI), and may be conducted with the addition of iron salts. The process of the instant invention is capable of removing all selenium compounds from aqueous systems. Optionally, the pH of the solution being treated may be adjusted to a pH of from 0–13 and preferably 2–10 to help increase removal rates. In a most preferred embodiment, pH is maintained at a level of 5 or less.

OBJECT OF THE INVENTION

It is accordingly an object of this invention to provide to the art a novel method for the removal of selenium containing compounds from waste waters which could be practiced efficiently, yield low volume amounts of waste materials, and which would produce water containing no more than 100 ppb selenium compounds. It would be a further advance to the art, and a further object of this invention to provide to the art a method for the removal of soluble selenium compounds from waste waters generated from agricultural run-off, cooling towers, boilers, refinery waste, chemical processing waste and the like.

THE INVENTION

The basic method of this invention for the removal of soluble selenium compounds from an aqueous liquid comprises:

a) adjusting the pH of the aqueous liquid containing the selenium compounds to a value of about 5 or less;

b) treating the aqueous liquid with a selenate and selenite precipitating amount of a polydithiocarbamate precipitation aid;

c) mixing the precipitation agent with the aqueous liquid to produce a selenium containing precipitate;

d) removing the selenium precipitate from the aqueous liquid; and, e) recovering an aqueous liquid having reduced levels of selenium.

The preferred chemical precipitation agents of this invention are of the type described in U.S. Pat. Nos. 5,164,095 and 5,346,627, both of which are hereafter incorporated by reference into this specification. These two patents disclose the composition and method of manufacture of certain ethylene dichloride-ammonia polymers which contain at least 5 weight percent of dithiocarbamate salt groups. These polymers are herein referred to as polymeric dithiocarbamate materials. While disclosing the removal of transition metals from aqueous systems, the two above mentioned patents do not deal with the problems associated with non-metals, or with the removal of soluble oxy-anions of non-metals such as selenium.

The preferred polymeric dithiocarbamate materials useful in this invention comprise a water soluble ethylene dichloride-ammonia polymer having a molecular weight of from 500 to 10,000 that contains from 5 to 50 mole percent of dithiocarbamate salt groups. The ethylene dichloride-ammonia polymers are prepared by the reaction of ethylene dichloride and ammonia as detailed in the '095 and '627 patents listed above. A typical reaction for producing these polymers will be illustrated hereinafter. The starting ethylene dichloride-ammonia polymers generally have a molecular weight range of from about 500 to about 100,000. In a preferred embodiment, the molecular weight is from about 1,500 to about 10,000 with a most preferred molecular weight range of from about 1,500 to about 5,000.

By way of example, and not limitation, the preparation of such polymers can be as set forth in Example 1.

EXAMPLE 1

To a pressure reactor was charged 13.275 parts of aqueous ammonium hydroxide followed by 9.357 parts anhydrous ammonia, 1.72 parts water, and 0.4 parts of EDTA. The reactor was sealed and heated to 115°–130° C. at which time 32.58 parts of ethylene dichloride (EDC) was slowly pumped in. After the addition of about 1.7 parts EDC, 42.664 parts of 50 percent sodium hydroxide was added at about the same rate as the EDC. The additions were completed in approximately 4.5 hours, The material was then concentrated under reduced pressure to remove residual monomeric material, sodium chloride byproduct is removed by centrifugation and water is added to make a polymer solution containing approximately 30% by weight active materials. This material is recovered for further treatment.

Following this preparation, 62.4 parts of the ethylene dichloride-ammonia polymer composition prepared above was added to a reactor and reacted with about 10.51 parts of carbon disulfide in the presence of 19.5 parts of 50% aqueous sodium hydroxide and 7.6 parts water. The reaction was kept at a temperature of about 30°–35° C. for about four hours after which the mixture was cooled and a vacuum applied for 5 minutes to remove residual carbon disulfide. The resulting solution product contained about 230 weight percent of the modified polymer. This material is hereinafter referred to as Example 1.

While carbon disulfide modified ethylene dichloride-ammonia polymers are preferred, other water soluble polymers containing dithiocarbamate functionality may be utilized. Polymers of this type include those described in European Patent Application 0 090 551 and described as polyethyleneimine dithiocarbamate materials. Other additives include epichlorohydrindimethylamine polymers which have been modified to obtain dithiocarbamate functionality. These polymers are also polymeric dithiocarbamate materials that are within the scope and spirit of the instant invention.

In the use of the polymers to remove selenates and selenites from aqueous systems, the polymers may be added directly to the waste water, mixed with the waste water to ensure overall contact, and then any resulting precipitate may be separated.

While most uses of the modified polymers to remove transition metals occur at optimum pH values of from about 6 to about 10, we have surprisingly found that the modified polymer treatment is more effective in the removal of selenium compounds when the water to be treated is acidic, having a pH value of about 5 or less. There does not appear to be a minimum pH value which the process of the invention exhibits decreasing efficiency within this range. Satisfactory removal rates for selenium have been conducted at pH values as low as 1.4. Those skilled in the art of waste water treatment will readily understand the procedures utilized to lower the pH of the waste water prior to treatment with the modified dithiocarbamate polymers of this invention. In general, pH adjustment of the waste water may be effectively accomplished by the addition to the waste water of inexpensive commonly available mineral acids such as sulfuric, phosphoric, hydrochloric, or the like. While other acids may be utilized, the economic effect of utilizing more expensive pH adjusting materials will be readily apparant to those skilled in the art. In adding the acid to adjust the pH of the waste water, an effective amount is utilized to lower the pH to a value of 5 or lower as measured using a pH meter, or any number of visual pH indicators. While the invention may be practiced at a pH value greater than 5, and within the range of a pH of from 2–12, selenium removal rates on liquids maintained at pH values above about 5 fall off rapidly, and thus practice at pH values outside of our preferred range is not desirable when it is desired to remove substantially all of the selenium compounds contained in the liquid.

In using the dithiocarbamate polymers of this invention, care must be taken to ensure that sufficient polymer is added to complex with selenites and selenates present, as well as other heavy metals that may be complexed with the polymer as taught in the '095 and '627 patents mentioned above.

What is surprising, that while dithiocarbamates appear to be effective in the removal of heavy metal cations, the selenium compounds present in aqueous systems are contained in anions. It is surprising that a material known to remove metal cations from waste waters would work on a non-metallic anion material. Generally, when the polymers of this invention are used to remove heavy metal cations from aqueous systems, they are added in essentially stoichiometric amounts based on the amounts of heavy metals present in the system. When the polymers of this invention are utilized to remove selenium however, from about 1–50 ppm of active polymer is required for each 100 ppb of selenium contained in the starting aqueous system, after adding sufficient polymer to precipitate other divalent heavy metal cations present in the system. In a preferred embodiment of this invention, the polymeric dithiocarbamate materials of this invention are added to provide about 1–25 ppm of active polymer per 100 ppb of selenium, and most preferably, from about 1 to 10 ppm of active polymer per 100 ppb of selenium present in the aqueous system. As seen, it is important that an excess of the theoretical stoichiometric amount of polymer must be added to cause selenium removal from the aqueous system.

The process of using the polymers of the invention may vary considerably depending upon the origin of the material, selenium content, pH, and oxidation state of selenium materials present in the aqueous system. If selenium is found in a valence state lower than +4, an appropriate oxidizing agent may optionally be added to the aqueous system, and allowed to react with the selenium compounds to produce selenium compounds having valences of substantially +4 or +6. Examples of suitable oxidizing agents that may be employed in aqueous systems for this purpose are those mentioned in U.S. Pat. No. 5,071,568 which is hereinafter incorporated by reference into this specification. These materials include compounds of the formula $X(ZO_a)_b$, $Q_mO_n$, $ClO_3^-$, $Cl_2O_4^-$, $Br_3O_8^-$, $I_2O_5^-$ wherein X is a cation, Z is a halogen selected from the group consisting of chlorine, bromine, and iodine, a is an integer from 1–3, b is an integer equal to the valence of X, Q is chlorine or bromine, and m and n are each 1 or 2 provided that m+n equals 3. Preferably, X is selected from the group consisting of alkali metals and alkaline earth metals, and more preferably is selected from the group consisting of sodium, potassium, calcium, and magnesium. Most preferably, X is sodium or potassium with sodium being the cation of choice due to low cost and commercial availability. While chorine and bromine are the preferred halogens for Z, Z is most advantageously chlorine because of cost and commercial availability considerations. The preferred oxidation agents employed are within the formula $X(ZO_a)_b$ and the preferred materials are $Na_1ClO_b$. Specific preferred materials are sodium hypochlorite, sodium chlorite and sodium chlorate with the most preferred being sodium hypochlorite. With regard to oxidizing agents within the formula $Q_mO_n$, preferably Q is chlorine, m is 1 and n is 2, ie., the preferred oxidizing agents within the scope of this later formula is $ClO_2$. Other oxidizing agents which may find utility in this invention include hydrogen peroxide, organic peroxides such as t-butyl hydroperoxide, and the like. When oxidizing agents are employed, they may be added either before or after the pH of the aqeuous liquid being treated is adjusted to a value of 5.0 or less.

Whether or not oxidizing agent is added to the aqueous system, the process of this invention calls for the aqueous liquid containing selenate and selenite materials to be treated with the dithiocarbamate modified polymeric material. After addition of the polymer, the aqueous liquid is intimately admixed with the polymer. At this time, the liquid may be filtered to remove insoluble materials, for instance in a commercial ultrafiltration unit, or may be pumped to a clarifier, where the coagulated selenite and selenate materials are allowed to settle. If removed to a clarifer, the settling of the selenate and selenite materials may be hastened by the addition to the system of a conventional organic or inorganic flocculant material. Examples of organic flocculant materials conventionally used to treat waste water include high molecular weight polymers and copolymers of acrylamide and acrylic acid. These materials, being anionic or non-ionic in nature are attracted to the cationically modified polymers used to treat the selenate and selenite compounds of this invention. Because of charge attraction, it is thought that these polymers "bridge" the coagulated particles, forming flocs, and allowing for more complete settling. Occasionally, due to the character of the waste water being treated, it may be preferable to use a high molecular weight cationic polymer. These materials, examples of which include copolymers of acrylamide with cationic monomers selected from the group consisting of diallyldimethylammonium chloride; dimethylaminoethylmethacrylate (DMAEM); DMAEM, methyl chloride quaternary; DMAEM, methyl sulfate quaternary; DMAEM, benzyl chloride quaternary; dimethylaminoethylacrylate (DMAEA); DMAEA, methyl chloride quaternary; DMAEA, methyl sulfate quaternary.; DMAEA, benzyl chloride quaternary; methacrylamidopropyltrimethyl ammonium chloride (MAPTAC); and the like. The correct choice of flocculants for use in the process of the subject invention can be readily determined using conventional jar tests, which will be familiar to those skilled in the art. Inorganic flocculants which can be utilized to hasten the settling of the modified polymer-selenate/selenite complex formed hereunder include ferric chloride, ferric sulfate, ferric hydroxide, iron sulfide, aluminum chloride, aluminum sulfate (alum), and the like. A preferred inorganic flocculant for use in conjunction with this invention includes iron chloride. The use of iron chloride to produce a ferric hydroxide coflocculant is discussed in U.S. Pat. No. 4,806,264 which is hereinafter incorporated by reference into this specification. Also of interest is *Field evaluation of arsenic and selenium removal by iron coprecipitation,* Merrill, D. T.; Manzione, M. A.; Peterson, J. J.; Parker, D. S.; Chow, W.; and Hobbs, A. O. appearing in the Journal Water Pollution Control Federation Volume 58, Number 1, January, 1986 which is also hereinafter incorporated by reference into this specification. This reference also details the removal of selenite and selenate using iron coprecipitation techniques. The use of ferric chloride, sulfate, or similar salt will be readily apparent, and well known to those skilled in the art of waste water treatment, and further discussion of this technique is not merited herein. While the use of inorganic flocculant coprecipitates is contemplated herein, it is not a preferred practice of this invention due to the volume of sludge produced.

When filtration is employed as a method for removal of the polymer/selenite/selenate complex, care must be taken to use as small a filter orifice as possible since the polymer/selenite/selenate complex is often almost colloidal in size. As the examples set forth hereinafter suggest, after the waste water is treated with an effective amount of the modified dithiocarbamate polymer, the fluid may be passed through a filtering device designed to capture the selenium complexes. As those skilled in the art will appreciate, the filtering device may be positioned at an effective position along the waste water system. In addition, a multitude of filtering devices may be used to improve selenium removal.

The present invention provides an effective method to remove settleable as well as non-settleable solids. Settleable solids refers generally to solids, typically >10 microns in diameter that settle unaided to the bottom of the container or sedimentation basin within 4 hours. The use of filtering devices pursuant to this invention eliminates the need for extensive settling of selenium complexes, thereby decreasing the time needed for effective collection. As a result, the present invention provides a more cost effective method of metal removal.

The present invention also collects nonsettleable solids. Nonsettleable solids refers to solids that do not settle in a reasonable time. For example, solids generally ranging in diameter from 0.001 to 10 microns are considered nonsettleable solids. In low selenium containing waters, the present invention thus optionally provides an effective method to remove such nonsettleable solids that lack the solids needed to build floc size to settleable size.

Filtering devices that may be used in the present invention include filters suitable for nanofiltration, ultrafiltration, microfiltration and particle filtration techniques. In an embodiment of this invention, a filter suitable for microfiltration techniques is utilized. In a preferred embodiment, suitable filtering devices are a conventional sand filter, a mixed media filter, a membrane filter having pore size openings of from 0.001 μm to 10 μm, with a preferred filter size of about 0.45μm.

While filtering devices may eliminate the need for solids settling, allowing some degree of settling prior to filtration will further increase the effectiveness of selenium removal. Thus, in an embodiment, the method includes the additional step of allowing at least a majority of the selenium complexes to settle from the fluid stream as a precipitate prior to passing the fluid stream through a filtering device.

After settling or filtration, the modified-polymer/selenate/selenite material, the settled material is collected and disposed of in a landfill or is otherwise collected and properly disposed of. The remaining waste water may be disposed of, or, a portion of the water may be disposed of, and a portion recycled in the process to the point where the modified ethylenedichloride-ammonia polymer is added to the aqueous system. By the careful and diligent use of the process of the instant invention, selenium levels in discharged water can be reduced to levels alowing water users to help meet the most stringent environmental selenium discharge limitations and to discharge almost zero selenium containing material.

In order to illustrate this invention, the following examples are presented.

EXAMPLE 2

A sample of biologically treated refinery effluent, from a west coast refinery containing 230 μg/l selenium, 1 mg/l of iron, less than 2 mg/l of heavy metals and over 3000 mg/l total dissolved solids at pH 8.5 was obtained. Beakers were prepared each containing 200 ml of sample. The appropriate amount of polymer from Example 1 was added, and the beakers were then rapid mixed with a gang stirrer for 15 minutes at about 140 rpm, slow mixed at about 30 rpm for 30 minutes, and were then allowed to settle for 60 minutes before filtering through a 0.45 μm membrane filter. Residual selenium was then determined by ICP with hydride generation preceeded by sample digestion in accordance with EPA method 207.2. Results are set forth in Table 1 below.

TABLE 1

| Sample | Polymer Dosage(ppm) | Residual Selenium(μg/l) |
|---|---|---|
| A | 0 | 230 |
| B | 2.5 | 220 |
| C | 5 | 240 |
| D | 10 | 230 |
| E | 15 | 230 |
| F | 20 | 190 |
| G | 25 | 200 |
| H | 50 | 160 |
| I | 100 | 110 |
| J | 150 | 100 |
| K | 200 | 160 |

EXAMPLE 3

This example illustrates a further reduction in residual selenium concentration by applying ultrafiltration following polymer treatment of the same refinery waste water used in the previous example. The testing employed a 3000 molecular weight cut-off ultrafiltration membrane operated at 30–45 psig. The results are contained in Table 2 below:

TABLE 2

| Sample | Polymer Dosage (ppm) | Residual Selenium after polymer treatment (μg/l) | Residual Selenium after ultrafiltration (μg/l) |
|---|---|---|---|
| A | 0 | 230 | 230 |
| B | 2.5 | 220 | 180 |
| C | 5 | 240 | 170 |
| D | 10 | 230 | 180 |
| E | 15 | 230 | 190 |
| F | 20 | 190 | 140 |
| G | 15 | 200 | 160 |
| H | 50 | 160 | 110 |
| I | 100 | 110 | 57 |
| J | 150 | 100 | 45 |
| K | 200 | 160 | 81 |

EXAMPLE 4

This example illustrates the improvement in selenium removal obtained by adding iron in the form of a solution of ferric ion to the treated solution before treatment with the polymer of Example 1. Beakers containing 100 ml of the same refinery waste water sample used above were dosed with ferric sulfate, the pH adjusted to about 6.9, mixed with a gang stirrer at 60 rpm for thirty minutes, dosed with the appropriate amount of polymer from Example 1, rapid mixed for 5 minutes at about 140 rpm, slow mixed at about 25 rpm for 30 minutes and then filtered through a 0.45 μm membrane filter. Residual selenium was determined by ICP with hydride generation.

Results are shown in Table 3.

TABLE 3

| iron (ppm Fe) | Polymer Dosage (mg/l) | | | |
|---|---|---|---|---|
| | 0 | 10 | 20 | 30 |
| 0 | 230 | | | |
| 9 | 190 | 160 | 140 | 110 |
| 18 | 140 | 150 | 140 | 100 |
| 27 | 140 | 130 | 120 | 90 |

TABLE 3-continued

| iron (ppm Fe) | Polymer Dosage (mg/l) | | | |
|---|---|---|---|---|
| | 0 | 10 | 20 | 30 |
| 36 | 120 | | | |
| 45 | 81 | 88 | 77 | 64 |
| 63 | 47 | | | |
| 81 | 25 | | | |

EXAMPLE 5

Another effluent sample from the same refinery was pH adjusted before adding the polymer of Example 1. Beakers containing 100 ml of sample were rapid mixed with a gang stirrer for 15 minutes at about 100 rpm, slow mixed at about 25 rpm for 30 minutes and were allowed to settle for 30 minutes. The samples were then filtered through a 0.45 μm membrane filter. Selenium was determined by ICP with hydride generation. Results are shown in Table 4:

TABLE 4

| Initial pH | final pH | polymer mg/l | Se μg/l |
|---|---|---|---|
| 3.4 | 3.5 | 0 | 170 |
| 3.4 | 3.6 | 10 | 70 |
| 3.4 | 3.7 | 20 | ≦20 |
| 3.4 | 3.7 | 30 | ≦20 |
| 3.4 | 3.7 | 50 | ≦20 |
| 3.4 | 3.8 | 75 | ≦20 |
| 3.4 | 3.8 | 100 | ≦20 |
| 3.4 | 3.9 | 150 | ≦20 |
| 3.4 | 4.0 | 200 | ≦20 |
| 3.4 | 4.3 | 300 | ≦20 |
| 3.4 | 5.4 | 500 | ≦20 |
| 6.3 | 7.1 | 10 | 140 |
| 6.3 | 7.1 | 20 | 110 |
| 6.3 | 7.1 | 30 | 100 |
| 6.3 | 7.1 | 50 | 50 |
| 6.3 | 7.1 | 75 | ≦20 |
| 6.3 | 7.1 | 100 | 10 |
| 6.3 | 7.2 | 150 | 30 |
| 6.3 | 7.2 | 200 | 20 |
| 6.3 | 7.4 | 300 | 40 |
| 6.3 | 7.8 | 500 | 120 |
| 6.9 | 7.3 | 10 | 130 |
| 6.9 | 7.7 | 20 | 130 |
| 6.9 | 7.7 | 30 | 110 |
| 6.9 | 7.7 | 50 | 30 |
| 6.9 | 7.7 | 75 | 50 |
| 6.9 | 7.7 | 100 | 40 |
| 6.9 | 7.8 | 150 | ≦20 |
| 6.9 | 7.8 | 200 | 40 |
| 6.9 | 7.9 | 300 | 60 |
| 6.9 | 8.0 | 500 | 160 |
| 6.4 | 6.5 | 0 | 380 |

The method of the present invention may be utilized in a variety of fluid systems. While the invention may find its greatest utility in handling cooling system blow-down, the invention may also be used to treat waste streams in the refining, agricultural chemical, and glass industries. The process may also be used to treat production water obtained from the deemulsification of crude oils, coal plant wash waters, mine waste waters, agricultural runoffs, and the like.

It should be understood that various changes and modifications to the presently preferred embodiments described herein will be apparent to those skilled in the art. Such changes and modifications can be made without departing from the spirit and scope of the present invention, and without diminishing its intended advantages. It is therefore intended that such changes and modifications be covered by the appended claims.

Having thus described our invention, we claim:

1. A method for the removal of soluble selenium compounds from an aqueous liquid containing soluble selenite and selenate compounds which comprises:
    a) adjusting the pH of the aqueous liquid containing the selenium compounds to a value of about 5 or less:
    b) treating the aqueous liquid with a selenate and selenite precipitating amount of a water soluble polydithiocarbamate precipitation aid;
    c) mixing the water soluble polydithiocarbamate precipitation aid with the aqueous liquid to produce a selenium containing precipitate;
    d) removing the selenium precipitate from the aqueous liquid; and,
    e) recovering an aqueous liquid having reduced levels of selenium.

2. The method of claim 1 wherein the water soluble polydithiocarbamate precipitation aid is a polymer made by reacting an ethylenedichloride-ammonia condensation polymer with carbon disulfide.

3. The method of claim 2 wherein the precipitate is removed by filtration.

4. The method of claim 2 wherein an effective amount of a ferric salt coprecipitating aid selected from the group consisting of ferric hydroxide, ferric sulfate and ferric chloride is added to the aqueous liquid at a point in time after the addition of the precipitation aid.

5. The method of claim 2 wherein from 1–50 ppm of water soluble polydithiocarbamate precipitation aid is added per 100 ppb of soluble selenium compound present in the aqueous liquid.

6. The method of claim 2 wherein from 1–25 ppm of water soluble polydithiocarbamate precipitation aid is added per 100 ppb of soluble selenium compound present in the aqueous liquid.

7. The method of claim 2 wherein the aqueous liquid is cooling tower blow-down.

8. The method of claim 2 wherein the aqueous liquid is refinery waste water.

9. The method of claim 1 wherein an oxidizing agent is mixed with the aqueous liquid containing soluble selenium compounds prior to the addition of the water soluble polydithiocarbamate precipitation aid.

10. A method for the removal of soluble selenium compounds from an aqueous liquid containing soluble selenite and selenate compounds which comprises:
    a) treating the aqueous liquid with an oxidizing agent in an effective amount to oxidize selenium compounds having a −2 valence to +4 or +6;
    b) treating the aqueous liquid, at a pH value of 5.0 or less, with a selenate and selenite precipitating amount of a water soluble polydithiocarbamate precipitation aid;
    c) mixing the water soluble polydithiocarbamate precipitation aid with the aqueous liquid to produce a selenium containing precipitate;
    d) removing the selenium precipitate from the aqueous liquid; and,
    e) recovering an aqueous liquid having reduced levels of selenium.

11. The method of claim 10 wherein the water soluble polydithiocarbamate precipitation aid is a polymer made by reacting an ethylenedichloride-ammonia condensation polymer with carbon disulfide.

12. The method of claim 12 wherein the precipitate is removed by filtration.

13. The method of claim 11 wherein an effective amount of a ferric salt coprecipitating aid selected from the group consisting of ferric hydroxide, ferric sulfate and ferric chloride is added to the aqueous liquid at a point in time after the addition of the water soluble polydithiocarbamate precipitation aid.

14. The method of claim 11 wherein from 1–50 ppm of water soluble polydithiocarbamate precipitation aid is added per 100 ppb of soluble selenium compound contained in the aqueous liquid.

15. The method of claim 11 wherein from 1–25 ppm of water soluble polydithiocarbamate precipitation aid is added per 100 ppb of soluble selenium compound present in the aqueous liquid.

16. The method of claim 11 wherein the aqueous liquid is cooling tower blow-down.

17. The method of claim 11 wherein the aqueous liquid is a refinery waste water.

18. A method for the removal of soluble selenium compounds from an aqueous liquid containing soluble selenite and selenate compounds which comprises:

a) adjusting the pH value of the aqueous liquid to be treated to less than about 5.0;

b) treating the aqueous liquid with a selenate and selenite precipitating amount of a water soluble polydithiocarbamate precipitation aid;

c) mixing the water soluble polydithiocarbamate precipitation aid with the aqueous liquid to produce a selenium containing precipitate;

d) filtering the selenium precipitate from the aqueous liquid; and, e) recovering an aqueous liquid having reduced levels of selenium.

19. The method of claim 18 wherein the water soluble polydithiocarbamate precipitation aid is a polymer made by reacting an ethylenedichloride-ammonia condensation polymer with carbon disulfide.

20. The method of claim 19 wherein an effective amount of a ferric salt coprecipitating aid selected from the group consisting of ferric hydroxide, ferric sulfate and ferric chloride is added to the aqueous liquid at a point in time after the addition of the water soluble polydithiocarbamate precipitation aid.

21. The method of claim 19 wherein an oxidizing agent is mixed with the aqueous liquid containing soluble selenium compounds prior to the addition of the water soluble polydithiocarbamate precipitation aid.

22. The method of claim 19 wherein from 1–50 ppm of water soluble polydithiocarbamate precipitation aid is added per 100 ppb of selenium contained in the aqueous liquid.

23. The method of claim 19 wherein from 1–25 ppm of water soluble polydithiocarbamate precipitation aid is added per 100 ppb of selenium contained in the aqueous liquid.

24. The method of claim 19 wherein the aqueous liquid is cooling tower blow-down.

25. The method of claim 19 wherein the aqueous liquid is a refinery waste water.

* * * * *